Nov. 10, 1959   M. A. WACHS   2,911,851
PLANETARY TRANSMISSION

Filed Dec. 14, 1953   2 Sheets-Sheet 1

INVENTOR
MILLER A. WACHS
BY *M. B. Tasker*
ATTORNEY

Nov. 10, 1959 M. A. WACHS 2,911,851
PLANETARY TRANSMISSION
Filed Dec. 14, 1953 2 Sheets-Sheet 2

INVENTOR
MILLER A. WACHS
BY M. B. Tasker
ATTORNEY

2,911,851

PLANETARY TRANSMISSION

Miller A. Wachs, Stratford, Conn., assignor to United Aircraft Corporation, East Hartford, Conn., a corporation of Delaware Application December 14, 1953, Serial No. 397,854

4 Claims. (Cl. 74—675)

This invention relates to rotary wing aircraft and has as one of its objects improvements in the transmission means between the power means and the several rotors.

It is well recognized that in rotary wing aircraft weight is an even more important consideration than in fixed wing aircraft. One of the components of a rotary wing aircraft that is particularly troublesome in this respect is the transmission mechanism, since a big reduction in speed is required between the power source and the main rotor. This becomes an acute problem as the amount of horsepower involved increases, particularly if more than one engine is used.

It is an object of this invention to provide an improved transmission mechanism, or gear box, for rotary wing aircraft.

A further object is to provide a simple, three-stage reduction gear box of this type which is especially adapted for use in aircraft having a plurality of engines.

A yet further object of the invention is to provide a transmission mechanism of this type for a rotary wing aircraft having a plurality of engines and a plurality of rotors all operatively connected by a single gear box.

A further object of the invention is generally to improve the driving mechanism of rotary wing aircraft.

These and other objects and advantages of the invention will be pointed out or will become evident from a detailed description of a specific embodiment of the invention illustrated in the accompanying drawings.

Figure 1:
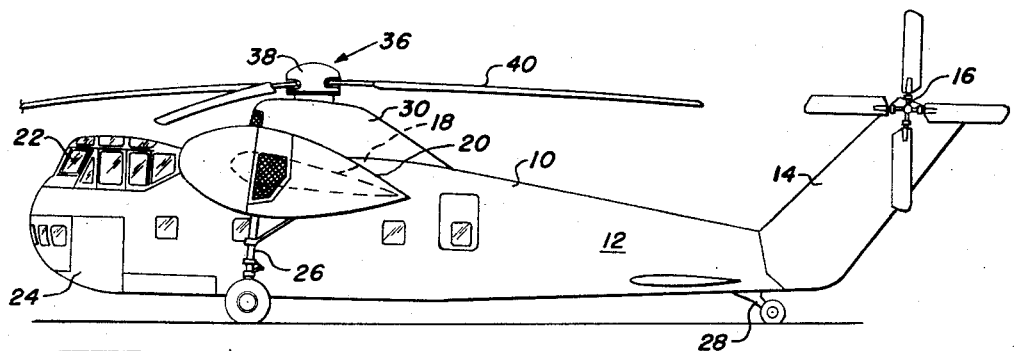
Fig. 1 is a side elevation of a twin engine helicopter of the type having a single sustaining rotor.

As shown in Fig. 1, the helicopter embodying the invention includes an elongated fuselage 10 having a tail cone 12 terminating in an empennage 14 which supports a tail rotor 16. The fuselage is provided with opposed laterally extended stub wings 18 which terminate in engine nacelles 20. The pilot's compartment 22 is located in the upper forward portion of the fuselage leaving the remainder of the fuselage unobstructed for passenger or cargo space, access to which is obtained through forward clamshell doors 24. The ship is provided with the usual main landing gear 26 supported by the wings and the tail landing gear 28 supported by the tail cone. A main rotor pylon 30 is provided above the fuselage in which a gear box generally indicated at 32 is located and from which the main rotor drive shaft 34 extends upwardly to support the main sustaining rotor 36 which includes a central hub 38 and a plurality of rotor blades 40.

Figure 2:
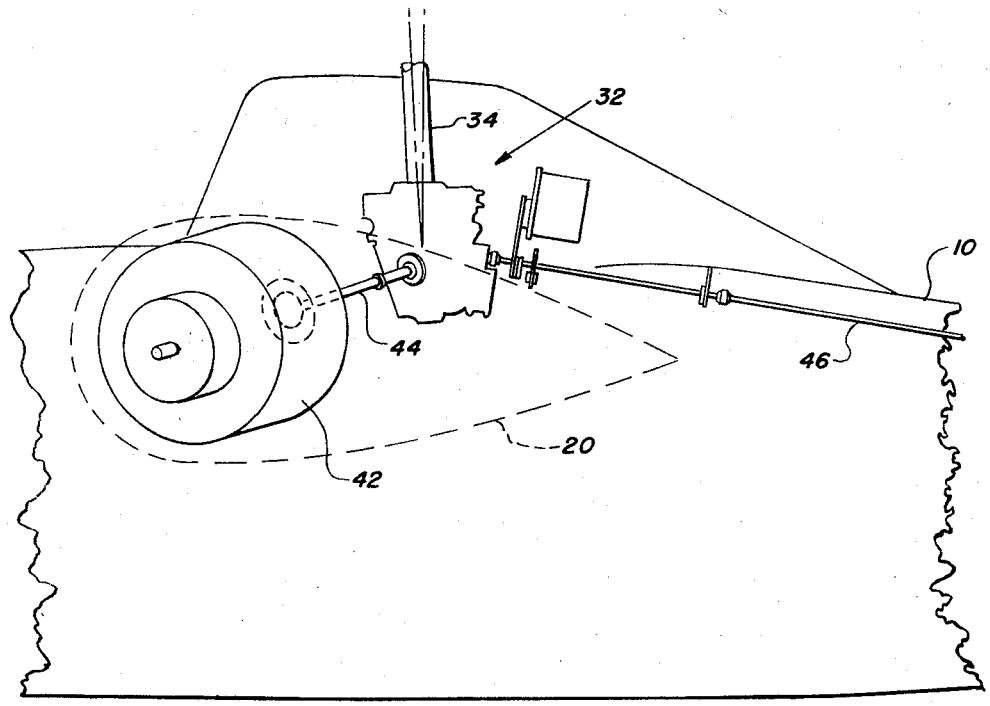
Figs. 2 and 3 are fragmentary views of the helicopter of Fig. 1 showing the operative connections of the engines and rotor drives to the gear box.

An engine 42, one of which is shown diagrammatically in Fig. 2, is located in each of the nacelles 20 and has a drive shaft 44 extended obliquely upwardly and inwardly into the gear box 32. The tail rotor 16 is driven by a shaft 46 which also extends into the gear box 32 as shown in Fig. 2.

Figure 3:
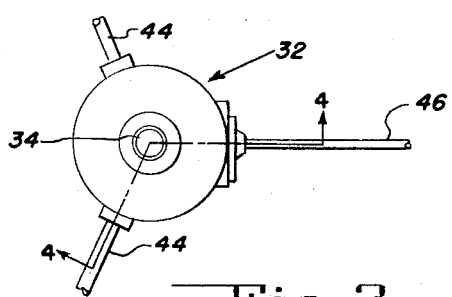
Figure 4:
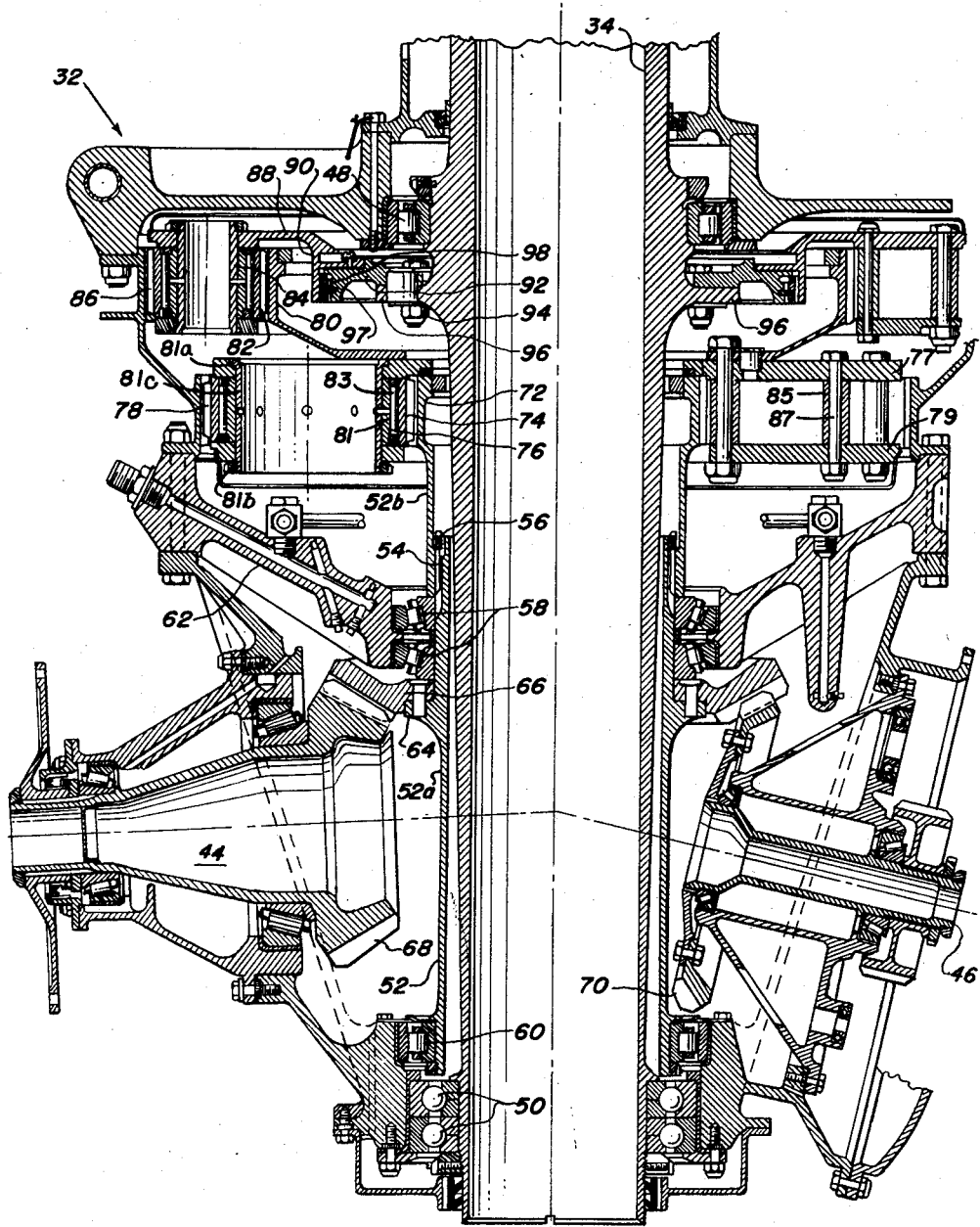
Fig. 4 is a sectional view on a much enlarged scale taken through the gear box on line 4—4 of Fig. 3.

The gear box 32 with which this invention is particularly concerned is shown in detail in Fig. 4, this sectional view being taken on lines 4—4 of Fig. 3. The gear box 32 is supported on fixed structure of the aircraft and consists of a plurality of casing parts bolted together in a usual manner. Rotor drive shaft 34 extends completely through the gear box from top to bottom and is journalled in the gear box on upper and lower bearings 48 and 50. This shaft as usual is of substantial diameter and is formed as a tube in order to provide strength with light weight.

The input shaft 52 of the gear box is also of tubular construction and surrounds the rotor drive shaft intermediate the ends of the latter. Herein the shaft 52 consists of a lower portion 52a and an upper portion 52b which are splined together at 54 and held in assembled relation by locking ring nut 56. The input shaft is also journalled at spaced points on the gear box casing by upper and lower bearings 58 and 60, the upper bearing 58 comprising opposed tapered thrust bearings carried by an inwardly directed flange 62 of the gear box. The lower portion 52a of the input shaft has an external flange 64 carrying a bevel gear 66 which constitutes the drive gear for the input shaft 52 and is located between bearings 58 and 60. The gear box is provided with two gears 68 one of which is shown in Fig. 4 which are drivingly connected to the engine drive shafts 44 of the two engines. Thus either or both of the engines 42 can drive the ring gear 66 on input shaft 52. The gear box is also provided with a tail rotor drive gear 70 which meshes with bevel gear 66 and is drivingly connected with the tail rotor drive shaft 46.

The input shaft 52 is connected to the rotor drive shaft 34 through a two-stage planetary gearing which provides the necessary speed reduction between these shafts. To this end the upper portion 52b of the input shaft carries a sun gear 72 which meshes with pinion gears 74 mounted on pinion carrier 76. The pinions 74 also mesh with a ring gear 78 carried by the gear box. The pinion carrier 76 also carries a second sun gear 80 which meshes with a plurality of pinions 82 on a second pinion carrier 84. A second ring gear 86 is provided on the gear box which meshes with the pinions 82. The second pinion carrier 84 has an inwardly directed flange 88 provided with an inner depending flange portion 90 which is parallel with the rotor drive shaft 34. The flange 90 is connected to shaft 34 by an intermediate member 92, the inner periphery of which is bolted by a series of bolts 94 to an outstanding flange 96 on the rotor drive shaft 34. The intermediate member 92 has an outer portion 97 which overlies the depending flange 90, the adjacent surfaces in flange 90 and member 96 being connected by a shear device 98 of helical formation. The purpose of this device is to shear and allow free rotation of the rotor drive shaft 34 in the event that, due to some accident, the rotating parts in the gear box become jammed or otherwise locked against rotation.

The pinion carriers of the two-stage planetary gearing are of improved construction. Considering the pinion carrier 76 it will be noted that it includes two parallel plates 77 and 79 between which the pinion gears 74 are journalled, each pinion having external teeth meshing with sun gear 72. A series of tubular bushings 81c extend through aligned apertures in plates 77 and 79 which carry tubular inner races 81 for needle bearings 83 on which the pinion gears 74 are journalled. Each of the tubular inner races 81 has its opposite ends abutting the confronting faces of plates 77 and 79 and determines the spacing of the plates. Bushings 81c have shoulders 81a overlying the exterior face of plate 77 and ring nuts 81b overlying the exterior face of plate 79 and clamp the plates against the ends of tubular bearing races 81. Between the pinion gears 74 additional spacing bushings 85 are provided which are clamped between plates 77 and 79 by through bolts 87.

This construction in which thin tubular parts are used provides a very rigid and light weight planetary gearing which is very compact. Further, it enables a large number of pinions to be utilized in a given pinion carrier diameter which reduces the tooth pressure on the planetary gears.

It will be evident that as a result of this invention a particularly simple and rugged gear box mechanism has been provided for a helicopter of the type in which a plurality of power sources have their drive shafts extended into the gear box and a plurality of rotor drive shafts take power out of the gear box. One advantage of this construction will be evident when it is noted that the rotor drive shaft 34 is entirely separately journalled in the gear box and extends completely through the latter while the input shaft which is also journalled in the gear box surrounds but is laterally spaced from the rotor drive shaft.

It will also be noted that the gear box construction of this invention is particularly adapted for a main sustaining rotor type helicopter having two engines in that the engine drive shafts and the tail rotor drive shaft are symmetrically located with respect to the main rotor drive shaft.

A further advantage of the gear box construction of this invention resides in the location of the helical shear device in the gear box between the second planetary gear carrier and the rotor drive shaft where the latter is afforded maximum protection against accidental jamming of the drive mechanism in the gear box.

A still further advantage of this gear box construction is that by providing a hollow through shaft, hot air may be pumped through to the blades for deicing, and hydraulic pipes for actuating hydraulic mechanism on the rotor head may be located on the center of rotation which permits a simple rotary transfer joint.

While the invention has been illustrated in connection with only one type of rotary wing aircraft, it will be evident that the novel constructions shown are applicable to other types of rotary wing aircraft without exceeding the scope of the invention.

I claim:

1. A transmission having a main housing, a first output shaft from said housing, means for rotatably mounting said first output shaft in said housing, the last named means having first bearing means between said first shaft and one side of said housing and second bearing means between said shaft and the opposite side of said housing, and an intermediate shaft in said housing coaxial with and surrounding said first shaft, means for rotatably mounting said intermediate shaft in said housing, the last named means having third bearing means between said intermediate shaft and a central portion of said housing and fourth bearing means between said shaft and said housing adjacent said second bearing means, a first input shaft rotatably mounted in said housing at a point between said third and fourth bearing means, a second input shaft rotatably mounted in said housing at a point between said third and fourth bearing means, a second output shaft rotatably mounted in said housing between said third and fourth bearing means, a first bevel gear mounted on the end of said first input shaft within said housing adjacent said intermediate shaft, a second bevel gear mounted on the end of said second input shaft within said housing adjacent said intermediate shaft, a third bevel gear mounted on the end of said second output shaft within said housing adjacent said intermediate shaft, a fourth bevel gear mounted on said intermediate shaft meshing with said first, second and third bevel gears, and planetary gearing located in the upper end of said housing above said third bearing means connecting said intermediate shaft to said first shaft.

2. A transmission having a main housing, a first output shaft from said housing, means for rotatably mounting said first output shaft in said housing, the last named means having first bearing means between said first shaft and one side of said housing and second bearing means between said shaft and the opposite side of said housing, and an intermediate shaft in said housing coaxial with and surrounding said first shaft, means for rotatably mounting said intermediate shaft in said housing, a circular flange extending from said housing inwardly towards said intermediate shaft, the last named means having third bearing means between said intermediate shaft and said circular flange and fourth bearing means between said shaft and said housing adjacent said second bearing means, a first input shaft rotatably mounted in said housing at a point between said flange and portion of housing supporting said second and fourth bearing means, a second input shaft rotatably mounted in said housing at a point between said flange and portion of housing supporting said second and fourth bearing means, a second output shaft rotatably mounted in said housing between said flange and portion of housing supporting said second and fourth bearing means, a first bevel gear mounted on the end of said first input shaft within said housing adjacent said intermediate shaft, a second bevel gear mounted on the end of said second input shaft within said housing adjacent said intermediate shaft, a third bevel gear mounted on the end of said second output shaft within said housing adjacent said intermediate shaft, a fourth bevel gear mounted on said intermediate shaft meshing with said first, second and third bevel gears, and planetary gearing located in the upper end of said housing above said flange connecting said intermediate shaft to said first shaft.

3. A transmission having a main housing, a first output shaft from said housing, means for rotatably mounting said first output shaft in said housing, the last named means having first bearing means between said first shaft and one side of said housing and second bearing means between said shaft and the opposite side of said housing, and an intermediate shaft in said housing coaxial with and surrounding said first shaft, means for rotatably mounting said intermediate shaft in said housing, a circular flange extending from said housing inwardly towards said intermediate shaft, the last named means having third bearing means between said intermediate shaft and said circular flange and fourth bearing means between said shaft and said housing adjacent said second bearing means, a first input shaft rotatably mounted in said housing at a point between said flange and portion of housing supporting said second and fourth bearing means, a second input shaft rotatably mounted in said housing at a point between said flange and portion of housing supporting said second and fourth bearing means, a second output shaft rotatably mounted in said housing between said flange and portion of housing supporting said second and fourth bearing means, a first bevel gear mounted on the end of said first input shaft within said housing adjacent said intermediate shaft, a second bevel gear mounted on the end of said second input shaft within said housing adjacent said intermediate shaft, a third bevel gear mounted on the end of said second output shaft within said housing adjacent said intermediate shaft, said third bevel gear having a larger diameter than said first and second bevel gears, a fourth bevel gear mounted on said intermediate shaft meshing with said first, second and third bevel gears, and planetary gearing located in the upper end of said housing above said flange connecting said intermediate shaft to said first shaft.

4. A transmission having a main housing, a first output shaft from said housing, means for rotatably mounting said first output shaft in said housing, the last named means having first bearing means between said first shaft and one side of said housing and second bearing means between said shaft and the opposite side of said housing, and an intermediate shaft in said housing coaxial with and surrounding said first shaft, means for rotatably mounting said intermediate shaft in said housing and spacing it from said first shaft, said intermediate shaft and said first output shaft forming an annular opening from one end of the intermediate shaft to the other end, the last named means having third bearing means between said intermediate shaft and a central portion of said housing and fourth bearing means between said shaft and said housing adjacent said second bearing means, a first input shaft rotatably mounted in said housing at a point between said third and fourth bearing means, a second input shaft rotatably mounted in said housing at a point between said third and fourth bearing means, a second output shaft rotatably mounted in said housing between said third and fourth bearing means, a first bevel gear mounted on the end of said first input shaft within said housing adjacent said intermediate shaft, a second bevel gear mounted on the end of said second input shaft within said housing adjacent said intermediate shaft, a third bevel gear mounted on the end of said second output shaft within said housing adjacent said intermediate shaft, a fourth bevel gear mounted on said intermediate shaft meshing with said first, second and third bevel gears, and planetary gearing located in the upper end of said housing above said third bearing means connecting said intermediate shaft to said first shaft.

References Cited in the file of this patent

UNITED STATES PATENTS

| | | |
|---|---|---|
| 1,273,950 | Teltzrow | July 30, 1918 |
| 1,980,601 | Stickel | Nov. 13, 1934 |
| 2,351,219 | McMullen | June 13, 1944 |
| 2,505,002 | Orr | Apr. 25, 1950 |
| 2,520,887 | Miller | Aug. 29, 1950 |
| 2,600,930 | Sikorsky | June 17, 1952 |
| 2,771,143 | Campbell | Nov. 20, 1956 |

OTHER REFERENCES

"Aviation"—Basic Drives for Helicopter, pages 125–135, November 1944 (pages 129, 130 only).